UNITED STATES PATENT OFFICE.

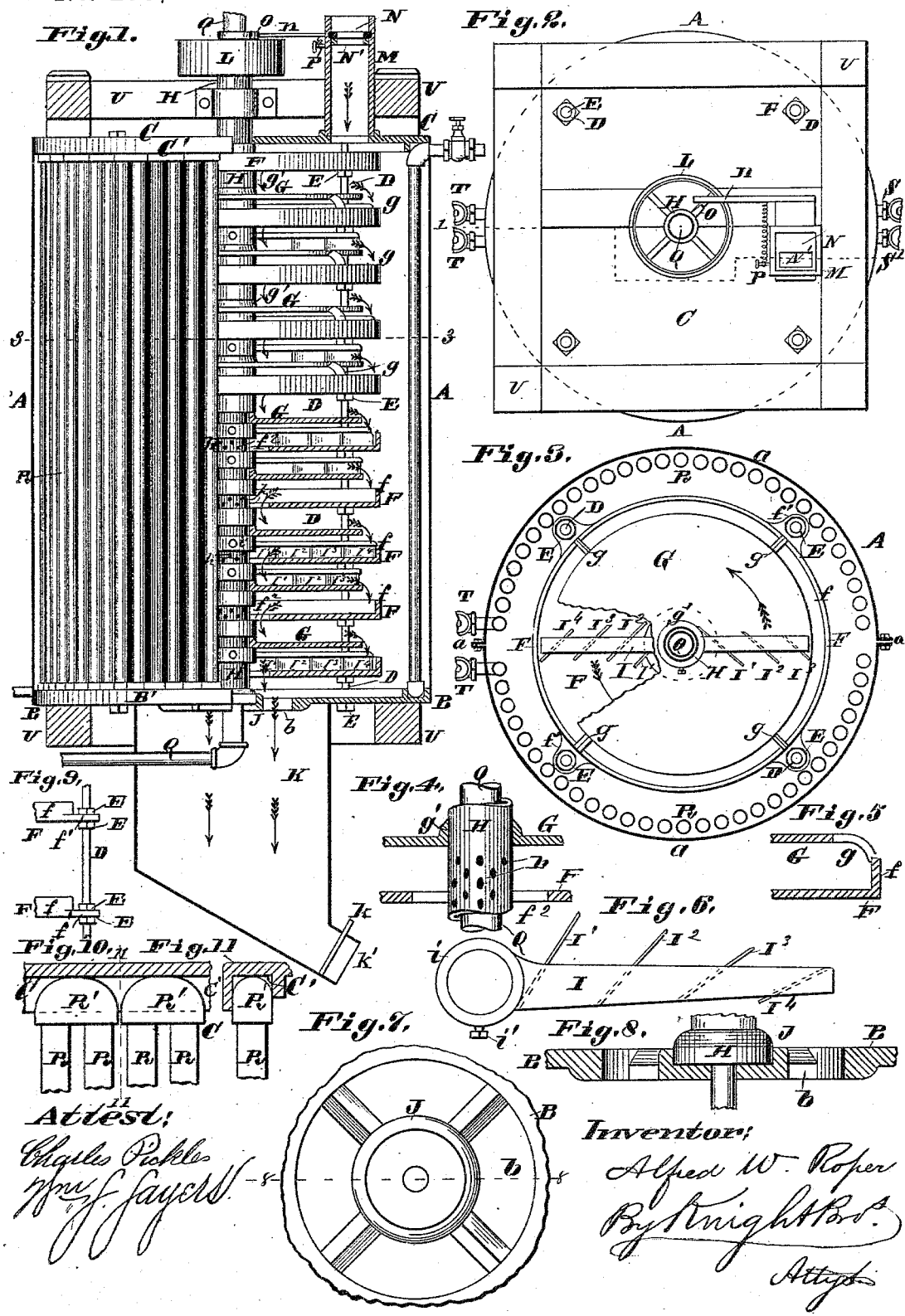

ALFRED W. ROPER, OF ST. LOUIS, MISSOURI, ASSIGNOR OF ONE-HALF TO GEORGE F. DURANT AND JAMES CAMPBELL, OF SAME PLACE.

MACHINE FOR ROASTING COFFEE.

SPECIFICATION forming part of Letters Patent No. 295,200, dated March 18, 1884.

Application filed June 16, 1883. (No model.)

*To all whom it may concern:*

Be it known that I, ALFRED W. ROPER, of the city of St. Louis, in the State of Missouri, have invented a certain new and useful Improvement in Machines for Roasting Coffee, of which the following is a full, clear, and exact description, reference being had to the accompanying drawings, forming part of this specification.

The claims are referred to for statement of invention.

Figure 1 is part in elevation with the outer case removed and part in vertical section at line 1 1, Fig. 2, but with some of the shelves over which the coffee passes shown in side view. Fig. 2 is a top view. Fig. 3 is a horizontal section at 3 3, Fig. 1. Fig. 4 is an enlarged detail showing the central pipes in side view and parts of two of the shelves in section. Fig. 5 is an enlarged detail showing the manner of supporting the upper shelf upon the lower one. Fig. 6 is an enlarged top view of one of the rake-arms or rakes. Fig. 7 is an enlarged detail top view, showing the step-block upon which the tubular central shaft is supported. Fig. 8 is a vertical section at 8 8, Fig. 7. Fig. 9 is a detail showing the connection between the lower shelves or pans and the upright rods upon which they are supported. Fig. 10 is an enlarged detail, part in vertical section and part in elevation, showing upper ends of outer series of heating-pipes with connecting "bends." Fig. 11 is a vertical section at 11 11, Fig. 10.

A is a cylindrical case, shown as consisting of two semi-cylinders connected by a vertical flange-joint with bolts at $a$. The case has a bottom plate, B, and top plate, C, fitting the lower and upper ends of the cylinder A. The plates B and C are connected together by vertical rods D, having upon them screw-threads and nuts E.

F are horizontal shelves of circular form, with upturned marginal flanges $f$. These pans have at the circumference lugs $f'$, through which pass the rods D, the pans being supported by the rods D and nuts E thereon. The pans F have central apertures, $f^2$, through which passes the vertical tubular rake-shaft H. The diameter of the apertures $f^2$ is greater than that of the shaft H, leaving an annular passage for the descent of the coffee to the flat shelf G below. The shelves G are supported on the pans F by means of legs $g$ projecting from the edge of the shelf and resting on the flanges $f$. The legs $g$ are acute at top to prevent lodgment of coffee-grains. The shelves G are made smaller in diameter than the shelves or pans F, so that the coffee drops from the edges of the shelves G into the pans F.

$g'$ is a circular flange upon the shelf G, said flange so closely surrounding the shaft H that no coffee-grains can pass between them. This flange is made of conical form, and it carries the coffee outward to the interior flight of the rake, by which the coffee is moved outward along the shelf and finally shoved off its edge.

Each rake consists of an arm, I, at whose inner end is an eye, $i$, fitting the shaft H as a collar, and held in position thereon by a set-screw, $i'$. The flights $I' I^2 I^3$, &c., upon the rakes are made less and less in length as their distance from the shaft H increases. The result of this arrangement is that the coffee nearer to the shaft is moved outward faster than the coffee nearer to the edge of the shelf. In like manner the coffee passing along the shelf or pan F is made to move with increasing speed as it approaches the shaft H and the aperture $f^2$, through which it falls upon the shelf G below. The flights on the rakes have (of course) the required inclination to give the inward movement to the coffee on the pans F and the outward movement to it on the shelves G. The shaft H is stepped in a spider, J, spanning the discharge-opening $b$ in the bottom plate, B. K is a hopper receiving the roasted coffee and discharging by a spout, $k'$, into the cooler. $k$ is a valve in the spout $k'$. The upper end of the tubular shaft H carries a pulley, L, to receive the drive-belt.

M is the hopper, through which the raw coffee is fed into the upper pan, F.

N is a slide-valve, working through the hopper, and alternately opening and closing the valve-port N'. It will be seen the feed may be regulated by means of this valve. As a means of operating the valve, I show an arm, $n$, that is acted on by a cam, O, upon the shaft H. As the cam turns at each revolution it opens the valve, and as the cam escapes from the end of the arm the valve is closed by a return-spring, P.

Q is a fixed steam-pipe, that extends axially through the hollow shaft H, there being an annular space between them containing heated air that escapes through the holes $h$ in the shaft H.

R R are two semicircular series of steam-pipes within the case A. I propose to have a distinct current of steam through each series, the steam entering one of the end pipes of the series and passing through the whole series, through all the pipes and return-bends by which they are connected to the pipe at the other end of the series from which the condense-water and steam are discharged, S and T being respectively the induction and eduction valves. The pipes R are held in place by their return-bends R', which rest in the channels B' C' of the plates B and C. This apparatus, as described, may be supported in any suitable frame, U. The case is preferably jacketed to prevent escape of heat.

The operation is as follows: Green coffee is fed in at hopper M, the valve N being arranged to allow the proper amount to pass. The coffee falls on the first pan, F, and is carried by the rake inward to the central orifice, $f$, when it drops upon the conical collar or flange $g$, down which it slides to the rake and is by that carried to the margin of the plate or shelf G, from which it falls into the pan below. The coffee thus passes down to the hopper K, the valve $k$ of which may be closed; or it may be allowed to drop directly into the cooler. Usually the roaster is operating on one lot of coffee while the cooler is operating upon a lot previously roasted.

I claim as my invention—

1. The combination of fixed shelves or plates F G and revolving flight-rakes carried on a tubular shaft surrounding a fixed steam-pipe.

2. The combination of fixed shelves F G, rotating rakes with flights I' I², central steam-pipe, Q, outer steam-pipes, R, and inclosing-case A B C, with induction and eduction openings M K, substantially as set forth.

ALFRED W. ROPER.

Witnesses:
SAML. KNIGHT,
GEO. H. KNIGHT.